United States Patent [19]
D'Anna et al.

[11] Patent Number: 5,400,878
[45] Date of Patent: Mar. 28, 1995

[54] ROTARY VISCOUS DAMPER

[75] Inventors: Frank P. D'Anna, Seymour; Anthony V. Russo, Stratford, both of Conn.

[73] Assignee: United Technologies Corporation, Hartford, Conn.

[21] Appl. No.: 31,756

[22] Filed: Mar. 12, 1993

[51] Int. Cl.$^6$ ............................................. F16D 35/02
[52] U.S. Cl. .................................. 188/306; 188/293; 188/310
[58] Field of Search ............... 188/276, 290, 293, 294, 188/296, 306, 310, 322.5; 16/48.5

[56] References Cited

U.S. PATENT DOCUMENTS

| | | | |
|---|---|---|---|
| 2,699,846 | 1/1955 | Pitman et al. | 188/90 |
| 3,070,192 | 12/1962 | Barkalow | 188/90 |
| 3,119,469 | 1/1964 | Farr et al. | 188/266 X |
| 3,228,494 | 1/1966 | Rumsey | 188/90 |
| 3,861,503 | 1/1975 | Nash | 188/276 |
| 5,116,201 | 5/1992 | Fradenburgh et al. | 416/140 |

*Primary Examiner*—Robert J. Oberleitner
*Assistant Examiner*—Alfred Muratori
*Attorney, Agent, or Firm*—Terrance J. Radke

[57] ABSTRACT

One preferred embodiment of a rotary viscous damper that provides damping force constancy over the operating temperature range of a viscous working fluid includes a damper housing defining a stationary conical damping surface, a shaft member rotatably mounted in the damper housing, a rotor member having a rotating conical damping surface, a temperature compensation mechanism, and a bias spring. The stationary and rotating conical damping surfaces in opposed combination define the shear gap of the damper. The rotor member is mounted in combination with the shaft member, and is axially displaceable with respect thereto. The bias spring provides a constant spring force acting on the rotor member to axially position the rotor member to establish the baseline shear gap of the damper. The temperature compensation mechanism is mounted in compressive engagement with the rotor member and exerts a temperature-dependent biasing force thereagainst in opposition to the constant spring force. The temperature compensation mechanism includes a plurality of expansion elements mounted in combination with support sleeves. The expansion elements are formed from material having a high coefficient of thermal expansion and are operative, in response to temperature changes in the working fluid, to provide the temperature-dependent biasing force which causes axial displacement of the rotor member with respect to the shaft member. Axial displacement of the rotor member causes corresponding changes in the dimension of the shear gap to compensate for temperature-induced variations in the viscosity of the viscous working fluid to provide damping force constancy.

11 Claims, 4 Drawing Sheets

ROTARY VISCOUS DAMPER

FIELD OF THE INVENTION

The present invention relates to rotary viscous dampers, and more particularly, to a rotary viscous damper that provides damping force constancy over the operating temperature range of the viscous working fluid, the rotary viscous damper according to the present invention having particular utility in a helicopter main rotor assembly for damping lead-lag motions induced in the main rotor blades thereof.

BACKGROUND OF THE INVENTION

A helicopter main rotor assembly is subjected to various aerodynamic, inertial, and centrifugal forces and moments during flight operations. The main rotor assembly is designed to accommodate such forces and moments through the structural and functional characteristics of the various components comprising the main rotor assembly. Of particular concern in designing a helicopter main rotor assembly are centrifugal loading (due to rotation of the main rotor blades), torsional loading (due to pilot pitch control inputs), flapwise loading (due to aerodynamically induced out-of-plane blade motions, i.e., flapping), and edgewise or chordwise loading (due to aerodynamically induced in-plane blade motions, i.e., lead or lag).

Aerodynamic drag loads and/or coriolis forces acting on the main rotor blades cause chordwise loading thereof, resulting in lead-lag motions being induced in the main rotor blades. If such induced motions are not damped, the main rotor blades may experience forced, self-excited resonant vibrations, with the attendant deleterious effects. Several types of damping devices have been utilized in articulated main rotor assemblies to dampen the induced lead-lag motions of the main rotor blades, including hydraulic dampers, elastomeric dampers, and viscous dampers.

The typical hydraulic damper embodies a piston/cylinder arrangement wherein the cylinder housing is articulately mounted to the helicopter rotor hub and the piston is articulately mounted to the root end of the main rotor blade. The induced lead-lag motion of the main rotor blade causes movement of the piston, the motion of the piston generating a pressure differential that displaces working fluid between fluid-filled chambers via a damping orifice in the piston. The energy dissipated in displacing the working fluid effectively dampens the lead-lag motion of the main rotor blade. While hydraulic dampers are attractive for maintenance accessibility and ease of repair, repair costs may be excessive due to the high failure rate of damper seals as a result of the high pressures developed in the working fluid. In addition, high tolerance machining is required to fabricate hydraulic dampers to attain acceptable damping efficiencies.

Elastomeric dampers dissipate the energy of the induced lead-lag motions of the main rotor blade by shear deformation of a plurality of elastomeric laminates. The cost of fabricating elastomeric dampers is high, however. The stiffness properties of the elastomeric laminates must be maintained constant for all elastomeric dampers utilized for a specific damping problem, e.g., the set of dampers of a helicopter main rotor assembly. Variations in stiffness properties may engender divergence of the natural in-plane rotor frequency, and lead to main rotor assembly instability. Furthermore, elastomeric dampers are often stroke limited, i.e., the strain limits of the elastomeric material forming the elastomeric laminates limits the permissible shearing motion.

Viscous dampers dissipate energy to dampen induced lead-lag motions of main rotor blades by shearing a viscous working fluid between closely spaced plates or surfaces. The energy dissipation in viscous dampers, however, causes changes in the operating temperature of the viscous working fluid. Temperature changes in the viscous working fluid, in turn, cause corresponding changes in the viscosity of the viscous working fluid. If the operating temperature range of the viscous damping fluid is large, corresponding large changes in the viscosity thereof will be experienced.

The damping force provided by a viscous damper is defined by:

$$F = \frac{upVA}{92,900c}$$

where F is the damping force, u is the fluid viscosity, p is the fluid density, V is the shear velocity, A is the effective shear area, and c is the spacing between the shearing surfaces of the viscous damper, i.e., the shear gap. As an examination of the foregoing equation makes clear, large changes in the viscosity of the viscous working fluid result in large variations in the damping force provided by the viscous damper, i.e., the damping efficiency thereof is not constant over the operating temperature range of the viscous working fluid.

To provide viscous dampers having damping force constancy, viscous dampers have been developed wherein changes in the viscosity of the viscous working fluid are compensated by corresponding changes in at least one of the parameters of the damping force equation. For example, U.S. Pat. Nos. 3,861,503 and 2,699,846 disclose temperature-compensating viscous dampers wherein the size of the shear gap is changed to compensate for changes in viscosity of the viscous working fluid. Changes in shear gap sizing are achieved by forming the rotating member and the housing comprising the viscous damper, i.e., the shearing surfaces thereof, of materials having disparate coefficients of thermal expansion. Changes in the operating temperature of the viscous working fluid, therefore, cause disparate thermal dimensional changes in the shearing surfaces of the rotating member and the housing, such dimensional changes resulting in dimensional changes in the shear gap.

Another type of viscous damper that provides 20 temperature compensation through changes in the shear gap is disclosed in U.S. Pat. No. 3,070,192 wherein a distortable member is interposed between the damper housing and the rotating member. The distortable member, which is formed from a material having a high coefficient of thermal expansion, has the ends thereof constrained by the damper housing such that changes in the operating temperature of the viscous working fluid cause the distortable member to bow, resulting in changes in the shear gap defined between the distortable member and the rotating member.

A viscous damper that provides temperature compensation through changes in the effective shear area is described in U.S. Pat. No. 3,228,494. The shear area of the '494 viscous damper is defined by cylindrical damping surfaces of the damper housing and a damper sleeve rotatably mounted in combination with a rotating member. The damper sleeve is axially displaceable with respect to the rotating member in response to the net biasing force exerted by a helical compression spring and a temperature-dependent bi-metallic device, the constant biasing force of the compression spring acting in opposition to the temperature-dependent biasing force provided by the bi-metallic device. Axial displacement of the damper sleeve causes a change in the effective shear area defined by the cylindrical damping surfaces.

While such prior art viscous dampers tend to be relatively efficient in providing temperature compensation over the operating temperature range of the viscous working fluid, such viscous dampers are unnecessarily complicated mechanically, which reduces the reliability thereof. Moreover, mechanically complicated viscous dampers tend to be costly to fabricate, and require labor and time intensive procedures to assemble/disassemble. Furthermore, such viscous dampers are not easily adjusted to accommodate fabrication tolerance deviations, marked changes in ambient temperature conditions, and/or mechanical wear over time.

SUMMARY OF THE INVENTION

One object of the present invention is to provide a rotary viscous damper that is relatively uncomplicated mechanically, that provides a high degree of reliability, and that is readily assembled and/or disassembled.

Another object of the present invention is to provide a rotary viscous damper that provides damping force constancy over the operating temperature range of the viscous working fluid.

A further object of the present invention is to provide a rotary viscous damper that is adjustable to initialize and/or readjust the damping force provided thereby.

These and other objects are achieved by a rotary viscous damper according to the present invention that is operative to provide damping force constancy over the operating temperature range of a viscous working fluid.

The rotary viscous damper comprises a damper housing defining an internal damping chamber for the viscous working fluid and including an internal sidewall having a conical configuration with respect to the rotational axis of the rotary viscous damper, a shaft member rotatably mounted in combination with the damper housing, a rotor member having a peripheral surface having a conical configuration with respect to the rotational axis of the rotary viscous damper, a temperature compensation mechanism, and a bias spring. The rotor member is mounted in combination with the shaft member, and concomitantly, is axially displaceable with respect thereto. The conical internal sidewall and the conical peripheral surface define a stationary conical damping surface and a rotating conical damping surface, respectively, for the rotary viscous damper. The stationary and rotating conical damping surfaces in opposed combination define the shear gap of the rotary viscous damper.

The bias spring has a constant spring force and is mounted in combination with the shaft member to exert the constant spring force against the rotor member. The temperature compensation device is mounted in combination with the shaft member in compressive abutting engagement with the rotor member. The bias spring and the temperature compensation device in combination define an initial axial position for the rotor member that defines a baseline shear gap for the rotary viscous damper. The baseline shear gap defines the lower temperature limit of the operating temperature range of the viscous working fluid.

The temperature compensation device is operative in response to temperature changes in the viscous working fluid to exert a temperature-dependent biasing force, which acts in opposition to the constant spring force, against the rotor member to cause axial displacement thereof. Axial displacement of the rotor member causes dimensional changes in the shear gap of the rotary viscous damper by changing the relative spacing of the rotating conical damping surface with respect to the stationary damping surface. Shear gap dimensional changes compensate for changes in viscosity of the viscous working fluid due to temperature changes thereof such that the rotary viscous damper provides damping force constancy over the operating temperature range of the viscous working fluid.

In one preferred embodiment of the rotary viscous damper according to the present invention, the temperature compensation mechanism comprises a plurality of expansion elements mounted in combination by means of support sleeves. The expansion elements are formed from material having a high coefficient of thermal expansion such that temperature changes in the viscous working fluid cause corresponding thermal dimensional changes in the expansion elements. The thermal dimensional changes in the expansion elements generate the temperature-dependent biasing force of the temperature compensation device. In another embodiment of the rotary viscous damper, the temperature compensation mechanism comprises a single expansion element.

The rotary viscous damper according to the present invention may further include an adjustment mechanism to adjust the initial axial position of the rotor member to vary the baseline shear gap of the rotary viscous damper.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

Figure 1:
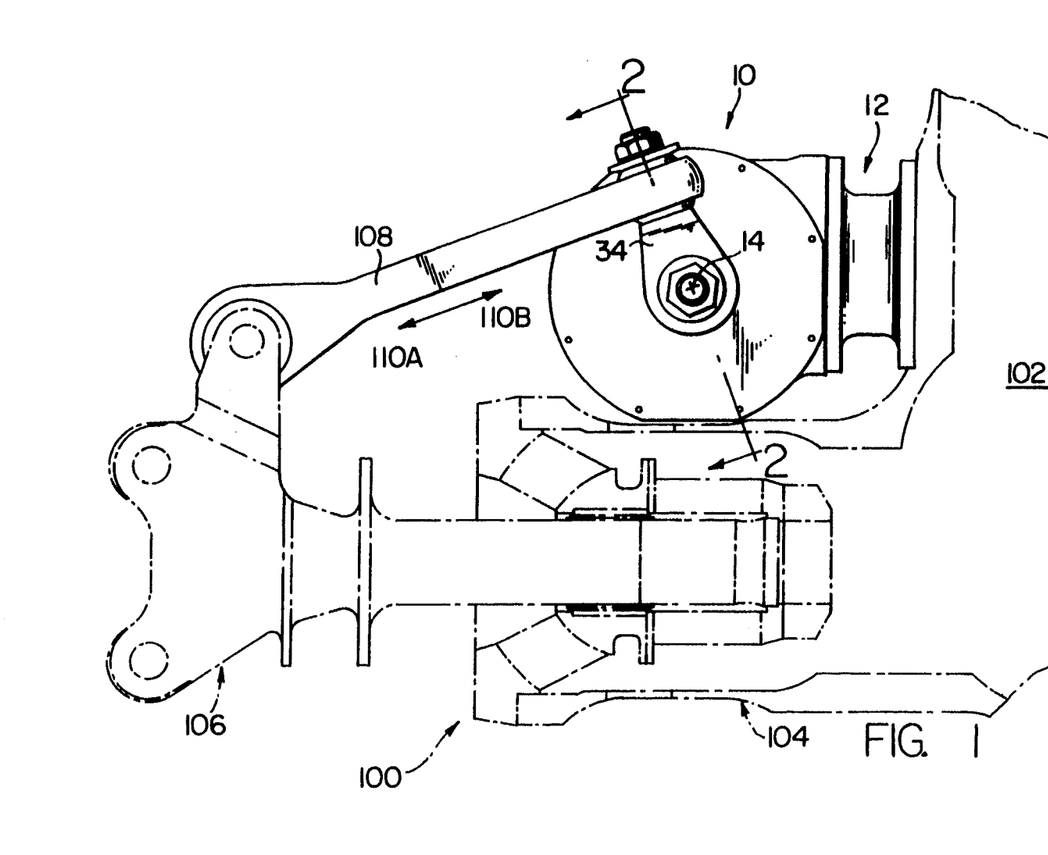
FIG. 1 is a partial top plan view of an exemplary helicopter main rotor hub assembly illustrating one preferred embodiment of a rotary viscous damper according to the present invention mounted in combination therewith.

Referring now to the drawings wherein like reference characters identify corresponding or similar elements throughout the several views, FIG. 1 is a partial top plan view of an exemplary main rotor hub assembly 100 of a helicopter. The hub assembly 100 comprises a main rotor hub 102 and a plurality of rotor hub arms 104 extending radially outwardly from, and equidistantly spaced about, the main rotor hub 102. A spindle assembly 106 is mechanically and functionally integrated in combination with each rotor hub arm 104. The outboard end of the spindle assembly 106 is configured to secure a main rotor blade (not shown) in combination with the main rotor hub assembly 100.

An external view of a rotary viscous damper 10 according to the present invention is illustrated in FIG. 1. The rotary viscous damper 10 is mechanically secured in combination with the main rotor hub 102, as exemplarily illustrated by reference numeral 12. A link member 108 mechanically secures the rotary viscous damper 10 in combination with the corresponding spindle assembly 106 (it will be appreciated that the main rotor hub assembly 100 has one rotary viscous damper 10 for each main rotor blade). The dynamic loads of the main rotor assembly, in particular, the lead-lag motion induced in the main rotor blade during operation of the main rotor assembly, e.g., by drag loads, coriolis forces, are transmitted as substantially linear motion, identified by reference numerals 110A, 110B, via the link member 108 to the rotary viscous damper 10. Such linear motion is transposed into rotational motion about the rotational axis 14 of the rotary viscous damper 10, as described in further detail hereinbelow.

Figure 2:
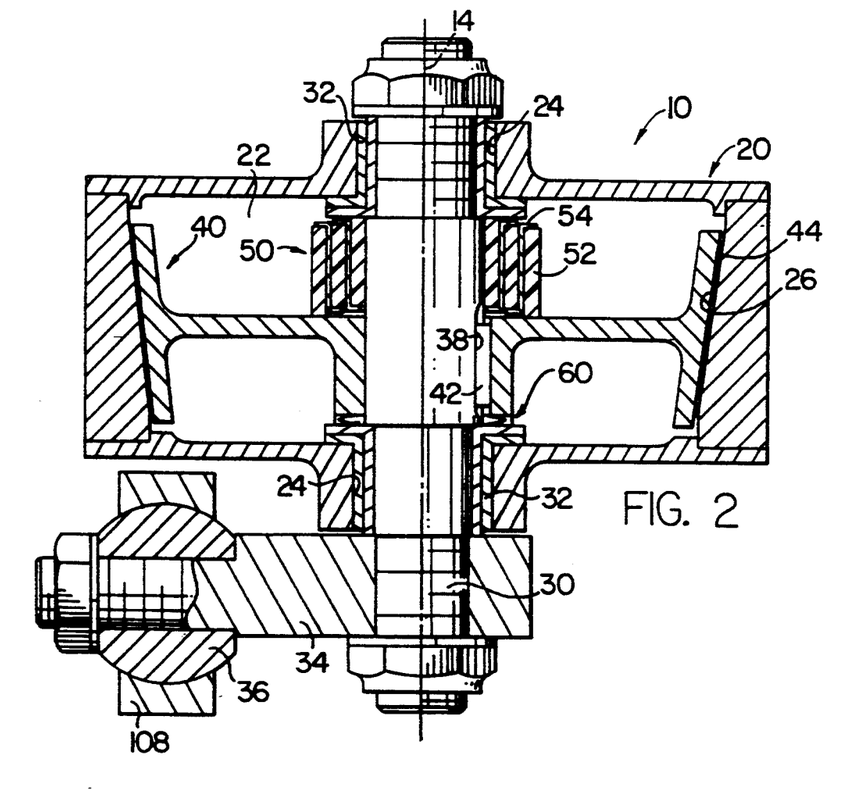
FIG. 2 is a cross-sectional view of the rotary viscous damper of FIG. 1 taken along line 2—2.

One preferred embodiment of the rotary viscous damper 10 according to the present invention is illustrated in FIG. 2 and comprises a damper housing 20, a shaft member 30, a rotor member 40, a temperature compensation device 50, and a bias spring 60. The rotary viscous damper 10 is operative to provide damping force constancy over the operating temperature range of a viscous working fluid to dampen the induced lead-lag motions of the main rotor blade, thereby inhibiting forced, self-excited resonant vibration of the main rotor blade in the chordwise direction. As used herein, damping force constancy means that the damping force provided by the rotary viscous damper 10 is directly proportional only to the fluid shear velocity and is unaffected by viscosity changes in the viscous working fluid due to temperature changes in the viscous working fluid. The rotary viscous damper 10 dissipates energy internally by shearing the viscous working fluid in a shear gap defined by spaced apart, relatively rotating damping surfaces of the damper housing 20 and the rotor member 40, respectively. The damping force constancy of the rotary viscous damper 10 is provided by the temperature compensation device 50, which is operative in response to changes in operating temperature in the viscous working fluid, to axially displace the rotor member 40, which causes dimensional changes in the shear gap.

The damper housing 20 defines an internal damping chamber 22 which is filled with the viscous working fluid. The damper housing includes a central aperture 24 for mounting the shaft member 30 in rotatable combination with the damper housing 20. The internal sidewall 26 (see also FIG. 3) of the damper housing 20 has a conical configuration with respect to the rotational axis 14 of the rotary viscous damper 10. The conical internal sidewall 26 comprises the stationary damping surface defining the shear gap of the rotary viscous damper 10.

The shaft member 30 is rotatably mounted in the central aperture 24 of the damper housing 20 by means of upper and lower low-friction bearing members 32 disposed in combination with the central aperture 24 and the shaft member 30, respectively. For the illustrated embodiment, each outer bearing member 32 is press fit into the central aperture 24 and each inner bearing member 32 is clamped to the shaft member 30 via a shoulder and nut assembly. The rotational axis 14 of the rotary viscous damper 10 coincides with the longitudinal axis of the shaft member 30. One end of a crank arm 34 (see also FIG. 1) is secured to the shaft member 30, the other end of the crank arm 34 is secured to the link member 108 via a universal joint 36. The linear motion 110A, 110B of the link member 108 is converted to rotational motion of the shaft member 30 by means of the crank arm 34.

The rotor member 40 is mounted in combination with the shaft member 30 so that the rotational motion of the shaft member 30 is imparted to the rotor member 40. Concomitantly, the rotor member 40 is axially displaceable with respect to the shaft member 30. As illustrated in FIG. 2, the rotor member 40 includes a key 42 that is disposed in a complementary keyway 38 of the shaft member 30, the interaction between the key 42 and keyway 38 facilitating axial displacement of the rotor member 40 with respect to the shaft member 30 while concomitantly imparting the rotational motion of the shaft member 30 to the rotor member 40. Alternatively, in lieu of the key 42, keyway 38 combination, the rotor member 40 and the shaft member 30 could include complementary interactive splines.

Figure 3:
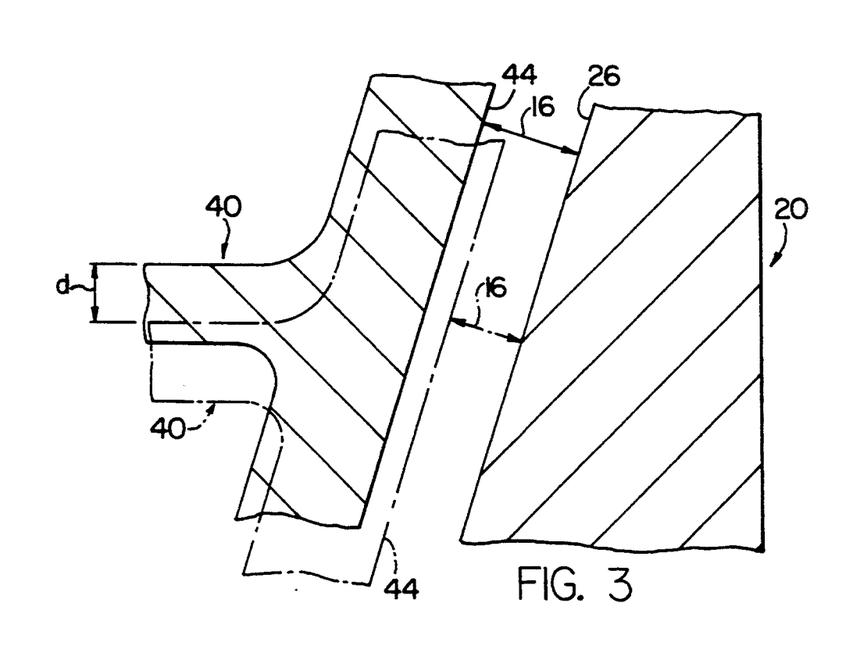
FIG. 3 is an enlarged, partial cross-sectional view of the rotary viscous damper of FIG. 2 illustrating a dimensional change in the shear gap as a result of axial displacement of the rotor member.

The peripheral surface 44 of rotor member 40 (see also FIG. 3) has a conical configuration with respect to the rotational axis 14 of the rotary viscous damper 10. The conical peripheral surface 44 comprises the rotating damping surface defining the shear gap of the rotary viscous damper 10. The relative spacing between the stationary conical damping surface 26 and the rotating conical damping surface 44 in opposed combination defines the shear gap 16 of the rotary viscous damper 10 according to the present invention, as illustrated in FIG. 3. The damping force provided by the rotary viscous damper 10 is due to the resistance of the viscous working fluid to the relative rotation between the stationary conical damping surface 26 and the rotating conical damping surface 44, i.e., the shearing of the viscous damping fluid in the shear gap 16.

The damping force provided by the rotary viscous damper 10 according to the present invention is defined by:

$$F = \frac{upVA}{92,900c}$$

where F is the damping force, u is the fluid viscosity, p is the fluid density, V is the shear velocity, A is the effective shear area, i.e., the surface area defined by the stationary conical damping surface 26 and the rotating conical damping surface 44 in opposed relation, and c is the orthogonal distance between the conical damping surfaces 26, 44, i.e., the shear gap 16. The operating temperature of the viscous working fluid changes as a result of energy dissipated therein due to the shearing thereof, i.e., energy dissipation is directly related to the shear velocity V so that as shear velocity V increases, energy dissipation increases and vice versa. As the operating temperature of the viscous working fluid changes, i.e., increases or decreases, the fluid viscosity u thereof indirectly changes, i.e., decreases or increases. An examination of the damping force equation shows that a change in viscosity u in the viscous working fluid will cause a corresponding change in the damping force F.

The temperature compensation device 50 according to the present invention provides compensation for changes in the viscosity u of the viscous working fluid of the rotary viscous damper 10. The temperature compensation device 50 is operative, in response to temperature changes in the viscous working fluid in the internal damping chamber 22, to provide corresponding dimensional changes in the shear gap 16, i.e., the parameter c of the damping force equation, such that damping force F constancy is provided by the rotary viscous damper 10 over the operating temperature range of the viscous working fluid.

The temperature compensation device 50 has a cylindrical configuration and is mounted in compression on the shaft member 30 in abutting engagement with the upper low-friction bearing members 32 and the rotor member 40. The temperature compensation device 50 is operative, in response to a temperature changes in the viscous working fluid, to exert a temperature-dependent biasing force against the rotor member 40. The temperature-dependent biasing force exerted by the temperature compensation device 50 causes the rotor member 40 to be axially displaced with respect to the shaft member 30 (towards/away from the crank arm 34). The upper low-friction bearing members 32 function as a stationary reaction surface with respect to the temperature-dependent biasing force exerted by the temperature compensation device 50.

Axial displacement of the rotor member 40 causes a corresponding change in the relative spacing between the stationary conical damping surface 26 and the rotating conical damping surface 44, i.e., dimensional changes in the shear gap 16. The effect of such axial displacement is exemplarily illustrated in FIG. 3. The rotor member 40 illustrated in solid in FIG. 3 is positioned at the lower temperature limit of the operating temperature range of the viscous working fluid, as described in further detail hereinbelow. In this initial spatial orientation, the rotating conical damping surface 44 and the stationary conical damping surface 26 in combination define the solid-line shear gap 16, which is the baseline shear gap of the rotary viscous damper 10. As the temperature of the viscous working fluid increases, the temperature compensation device 50 exerts a temperature-dependent biasing force against the rotor member 40 to cause an axial displacement d thereof (towards the crank arm 34), as exemplarily illustrated by the dashed lines of FIG. 3. In this new spatial orientation, the dashed-line rotating conical damping surface 44 and the stationary conical damping surface 26 in combination define the dashed-line shear gap 16. As an examination of FIG. 3 shows, the solid-line shear gap 16 is greater than the dashed-line shear gap 16, i.e., the shear gap 16 decreases with increases in the temperature of the viscous working fluid. The rotary viscous damper 10 according to the present invention is configured so that axial displacements of the rotor member 40, in response to temperature-dependent biasing forces exerted by the temperature compensation device 50, do not cause any significant change in the effective shear area A defined by the opposed surfaces of the stationary conical damping surface 26 and the rotating conical damping surface 44.

As FIG. 3 makes evident, temperature changes, i.e., increases or decreases, in the viscous working fluid cause the temperature compensation device 50 to effectuate a corresponding dimensional changes, i.e., decreases or increase, in the shear gap 16. The dimensional changes of the shear gap 16 are correlated with the changes in viscosity u of the viscous working fluid so that the damping force, F provided by the rotary viscous damper 10, as defined by the damping force equation, is constant over the operating temperature range of the viscous working fluid of the rotary viscous damper 10.

To achieve the requisite temperature-dependent biasing forces from the temperature compensation device 50, the device 50 is formed from a material having a high coefficient of thermal expansion over the operating temperature range of the viscous damping fluid. The coefficient of thermal expansion characteristic of the selected material, over the operating temperature range, is directly correlated with the viscosity changes experienced by the viscous working fluid over the operating temperature range. This ensures that changes in viscosity u over the operating temperature range are directly correlated with the changes in the shear gap 16 to provide damping force F constancy in the rotary viscous damper 10.

Figure 4:
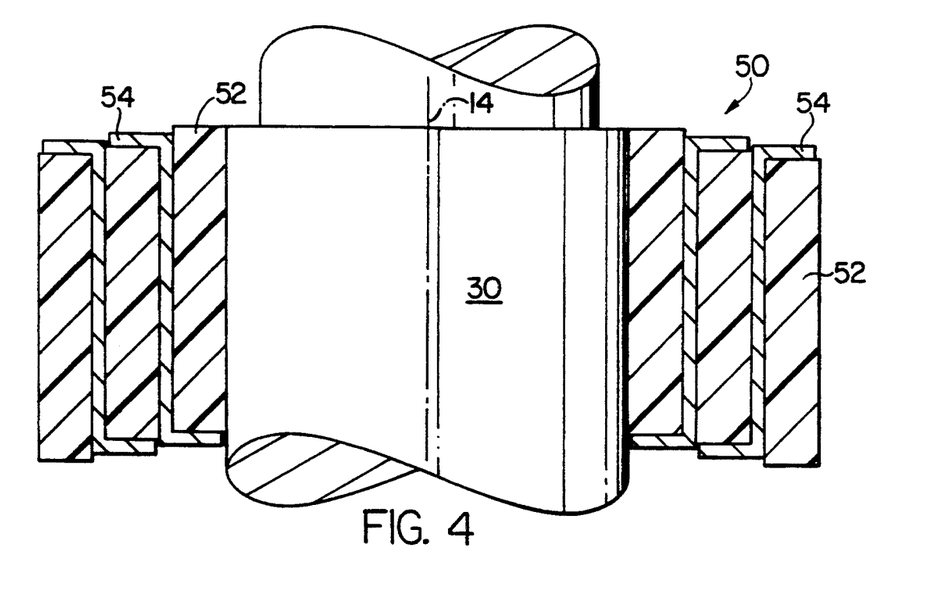
FIG. 4 is a partial, cross-sectional view of the temperature compensation device of the rotary viscous damper of FIG. 2.

One preferred embodiment of the temperature compensation device 50 according to the present invention is illustrated generally in FIG. 2 and in further detail in FIG. 4 and comprises a plurality of expansion members 52 having a high coefficient of thermal expansion, for example, a plastic such as nylon. The plurality of expansion members 52 are disposed in combination with a plurality of support sleeves 54, formed from a thermally stable material such as titanium (thermally stable being used herein in the context that the coefficient of thermal expansion of the material forming the support sleeves 54 is relatively small as compared to the coefficient of thermal expansion of the material of the expansion members 52). As the operating temperature of the viscous working fluid changes, the expansion members 52 experience corresponding thermal dimensional changes to provide the temperature-dependent biasing force that causes dimensional changes in the shear gap 16 to compensate for changes in the viscosity u of the viscous working fluid.

This embodiment has utility in the rotary viscous damper 10 where the viscous working fluid is markedly sensitive to operating temperature changes, i.e., large variations in fluid viscosity u over the operating temperature range of the viscous working fluid. The embodiment illustrated in FIG. 3 comprises three expansion members 52 disposed in combination with two support sleeves 54. One skilled in the art will appreciate that other combinations of expansion members 52 and support sleeves 54 may be utilized to form the temperature compensation device 50, depending upon the viscous working fluid utilized, the sensitivity of the viscous working fluid to temperature changes, and the operating temperature range of the viscous working fluid.

Figure 5:
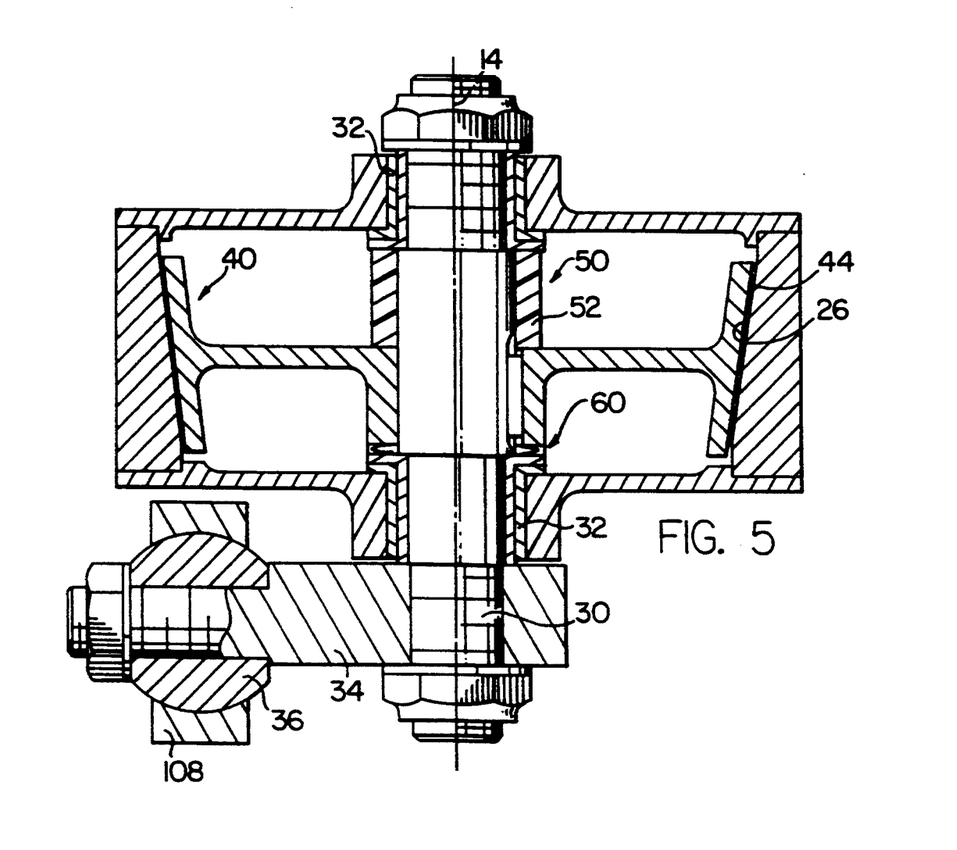
FIG. 5 is a cross-sectional view of another embodiment of a rotary viscous damper according to the present invention.

An alternative embodiment of the temperature compensation device 50 is illustrated in FIG. 5 and comprises a single cylindrical expansion member 52 formed from a material having a high coefficient of thermal expansion. This configuration of the temperature compensation device 50 is utilized in the rotary viscous damper 10 with a viscous working fluid that is relatively insensitive to temperature changes over the operating temperature range thereof. The utilization of the temperature compensation device 50 embodiment of FIG. 2 or FIG. 5 in the rotary viscous damper 10 depends upon the sensitivity of the viscous damping fluid to temperature changes, i.e., the rate of change of fluid viscosity with respect to temperature changes. The sensitivity of the viscous damping fluid, in turn, determines the magnitude of the temperature-dependent biasing force to provide the necessary displacement required from the temperature compensation device 50 to maintain damping force F constancy.

The bias spring 60 has a cylindrical configuration and is mounted on the shaft member 30 in abutting engagement with the lower low-friction bearing members 32 and the rotor member 40. The bias spring 60 is operative to exert a constant spring force against the rotor member 40, which acts in opposition to the temperature-dependent biasing force exerted by the temperature compensation device 50. The spring force of the bias spring 60 is selected so as to initially position the rotor member 40 at the lower temperature limit of the operating temperature range of the viscous working fluid, thereby establishing the baseline shear gap 16 for the rotary viscous damper 10 (such as illustrated in FIG. 3). The lower low-friction bearing members 32 function as a stationary reaction surface with respect to the static biasing force exerted by the bias spring 60. As the temperature of the viscous working fluid increases, the temperature-dependent biasing force exerted by the temperature compensation device 50 exceeds the constant spring force exerted by the bias spring 60 such that the rotor member 40 is axially displaced with respect to the shaft member 30 to cause dimensional changes in the shear gap 16, as discussed hereinabove.

The torsional loads of the rotary viscous damper 10 described hereinabove are reacted through the crank member 34, the shaft member 30, the keyway 38, key 42 combination, the rotor member 40, and the damper housing 20. These components should be fabricated from a material or materials having mechanical characteristics that can accommodate the torsional loads experienced by the rotary viscous damper 10, e.g., a metallic material. Concomitantly, such material(s) should have a coefficient of thermal expansion that is relatively stable over the operating temperature range of the viscous working fluid so that any thermally-induced dimensional changes in such components due to temperature increases in the viscous working fluid are de minimus, i.e., causing minimal deltas in the relevant parameters of the damper force equation.

As disclosed hereinabove, the main rotor assembly of a helicopter includes a set of rotary viscous dampers 10, the set number corresponding to the number of main rotor blades. Some components of each rotary viscous damper 10 described hereinabove are sensitive to tolerance deviations, e.g., due to fabrication machining, which may impact the damping force F provided by each rotary viscous damper 10, i.e., disparately effect the baseline shear gaps 16 of the rotary viscous dampers 10 comprising the set. Variations in the spring force of the bias spring 60 may also cause such an impact. In addition, the ambient environment may affect the lower temperature limit of the operating temperature range of the viscous working fluid, which impacts the damping force F provided by the rotary viscous damper 10. Variations in the damping forces F provided by a set of rotary viscous dampers 10 may cause differences in edgewise frequency among the main rotor blades comprising the main rotor assembly. This results in an out-of-track condition which adversely affects the useful service life of components of the main rotor assembly and/or the main rotor assembly control system. The out-of-track condition may also arise as a result of uneven wear over time among the components comprising the rotary viscous damper 10 set.

Figure 6:
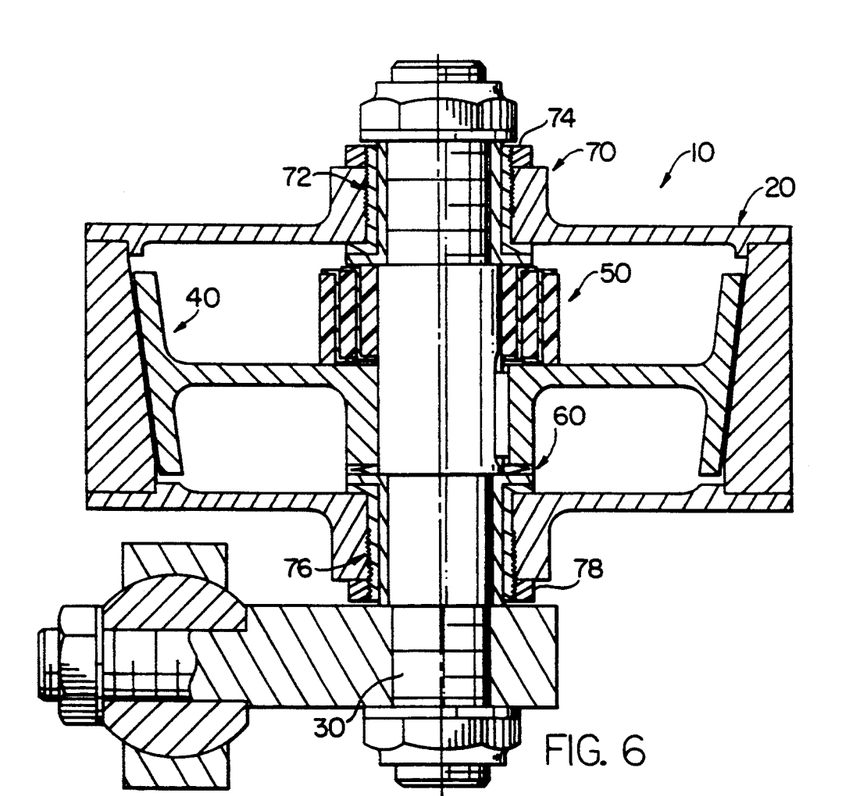
FIG. 6 is a cross-sectional view of the rotary viscous damper embodiment of FIG. 2 incorporating an adjustment mechanism.

An adjustment mechanism 70 may be included in the rotary viscous damper 10 described hereinabove, as exemplarily illustrated in FIG. 6, the adjustment mechanism 70 having particular utility for rotary viscous dampers 10 comprising a set, e.g., for a helicopter main rotor assembly. The adjustment mechanism 70 provides a means for adjusting the initial spatial orientation of the rotor member 40 vis-a-vis the damper housing 20, i.e., the initial spacing between the rotating conical damping surface 44 and the stationary conical damping surface 26 which defines the baseline shear gap 16, to initialize the damping force F provided by the rotary viscous damper 10 to a predetermined value. The adjustment mechanism 70 may also be utilized to readjust the spacing between the rotating conical damping surface 44 and the stationary conical damping surface 26 during maintenance to compensate for component wear in the rotary viscous damper 10 to ensure that all dampers 10 of the set are providing the same damping force F.

The adjustment mechanism 70 comprises upper and lower complementary threads 72, 76 formed in the upper and lower low-friction bearing elements 32 and the central aperture 24, respectively, and complementary upper and lower threaded jam nuts 74, 78. The upper and lower complementary threads 72, 76 facilitate rotational displacement of the upper and lower low-friction bearing elements 32 with respect to the corresponding central apertures 24. The upper and lower threaded bearing elements 32 are synchronously rotated, i.e., one clockwise, the other counterclockwise, the rotational displacement of the threaded bearing elements 32 causing axial displacement of the shaft member 30. Axial displacement of the shaft member 30, in turn, causes a corresponding axial displacement of the rotor member 40 to vary the baseline shear gap 16 to provide an increased or decreased damping force F, as required. The upper and lower threaded jam nuts 74, 78 are then threaded in combination with the threaded bearing elements 32 to lock the shaft member 30 in position. The adjustment mechanism 70 for the rotary viscous damper 10 facilitates initialization and/or readjustment of the damping force F provided by the rotary viscous damper 10 without requiring disassembly thereof, thereby eliminating the time and costs associated with the disassembly procedure.

Figure 7:
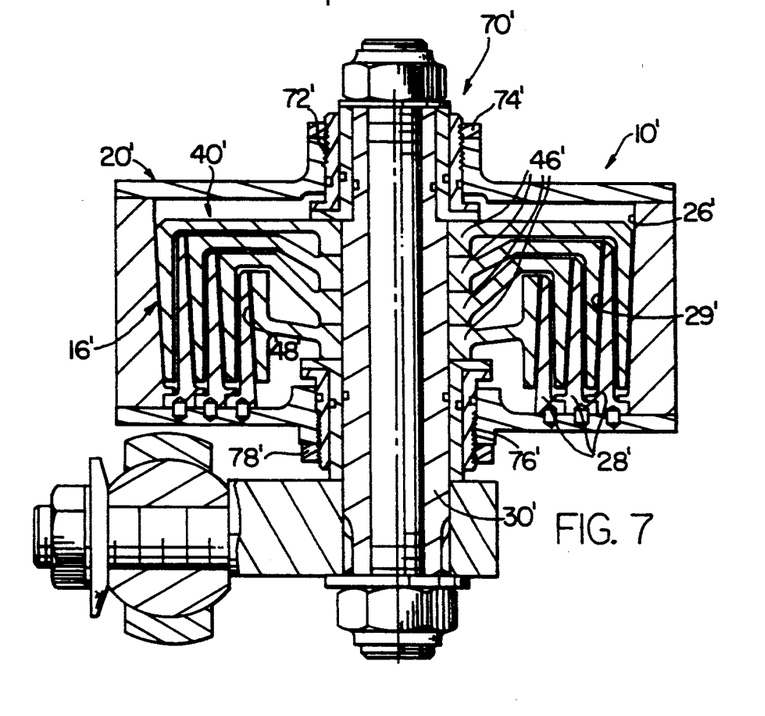
FIG. 7 is a cross-sectional view of the adjustment mechanism of FIG. 6 incorporated in a further embodiment of a rotary viscous damper.

The adjustment mechanism described in the preceding paragraphs may also be incorporated in a further embodiment of a rotary viscous damper 10' as illustrated in FIG. 7. The rotary viscous damper 10' comprises a damper housing 20' a shaft member 30', and a rotor member 40' functionally similar to the embodiments described hereinabove. In addition to the conical internal sidewall 26', the damper housing 20' further includes a plurality of stationary internal cylindrical partition walls 28' (the embodiment of FIG. 7 having three internal cylindrical partition walls 28'). One side 29' of each cylindrical partition wall 28' has a conical configuration with respect to the rotational axis 14' of the rotary viscous damper 10'. The rotor member 40' is comprised of a plurality of subrotors 46', each subrotor 46' having a peripheral surface 48' of conical configuration with respect to the rotational axis 14' of the rotary viscous damper 10'. The stationary conical damping surface 26', and the corresponding subrotor rotating conical damping surface 48' define one shear gap 16', and other shear gaps 16' are defined by respective opposed pairs of stationary conical damping surfaces 29' and subrotor rotating conical damping surfaces 48'.

The adjustment mechanism 70' for the rotary viscous damper 10' operates as described in the preceding paragraph to axially displace the shaft member 30', and concomitantly, each of the subrotors 46' comprising the rotor member 40'. Such axial displacement initializes the spacing between the stationary conical damping surface 26', the stationary conical damping surfaces 29', and the respective subrotor rotating conical damping surfaces 48' to define the corresponding baseline shear gaps 16'.

A variety of modifications and variations of the present invention are possible in light of the above teachings. For example, the embodiments of the rotary viscous damper disclosed hereinabove were described as indirectly mechanically coupled to the main rotor blade, i.e., to the spindle assembly. One skilled in the art will appreciate that the rotary viscous damper according to the present invention may be directly coupled in mechanical combination with the main rotor blade. Further, the embodiments of the rotary viscous damper of FIGS. 2 and 4 may include more than a single shear gap, i.e., multiple opposed pairs of stationary and rotating conical damping surfaces as described hereinabove in terms of the embodiment of FIG. 7. It is therefore to be understood that, within the scope of the appended claims, the present invention may be practiced otherwise than as specifically described herein.

What is claimed is:

1. A rotary viscous damper, comprising:
   a damper housing defining an internal damping chamber for a viscous working fluid, said damper housing having an internal sidewall having a conical configuration with respect to the rotational axis of said rotary viscous damper, said conical internal sidewall defining a stationary conical damping surface of said rotary viscous damper;
   a shaft member mounted in rotatable combination with said damper housing;
   a rotor member mounted in combination with said shaft member, said rotor member being axially displaceable with respect to said shaft member, said rotor member having a peripheral surface having a conical configuration with respect to the rotational axis of said rotary viscous damper, said conical peripheral surface defining a rotating conical damping surface of said rotary viscous damper;
   said stationary conical damping surface and said rotating conical damping surface in opposed combination defining a shear gap of said rotary viscous damper; and
   means for axially displacing said rotor member to cause dimensional changes in said shear gap.

2. The rotary viscous damper of claim 1 wherein said axial displacement means comprises:
   a bias spring having a constant spring force mounted in combination with said shaft member to exert said constant spring force against said rotor member; and
   a temperature compensation mechanism mounted in combination with said shaft member in compressive abutting engagement with said rotor member;
   said temperature compensation mechanism and said bias spring acting in combination against said rotor member to define a baseline shear gap for said rotary viscous damper, said baseline shear gap defining a lower temperature limit of an operating temperature range of the viscous working fluid;
   said temperature compensation mechanism being operative in response to temperature changes in the viscous working fluid to exert a temperature-dependent biasing force acting in opposition to said constant spring force against said rotor member to cause axial displacement thereof;
   axial displacement of said rotor member causing corresponding dimensional changes in said shear gap to compensate for changes in the viscosity of the viscous working fluid due to the temperature changes therein such that said rotary viscous damper provides damping force constancy over the operating temperature range of the viscous working fluid.

3. The rotary viscous damper of claim 1 wherein said axial displacement means comprises:
   threads formed in said damper housing;
   thread means disposed in combination with said shaft member for rotationally interacting with said threads of said damper housing; and
   first and second jam nuts configured for rotatable interaction with said thread means;
   synchronous rotational interaction between said thread and said thread means causing axial displacement of said shaft member, said shaft member being locked in position by threaded engagement of said first and second jam nuts with said thread means;
   axial displacement of said shaft member causing a corresponding axial displacement of said rotor member to establish a baseline shear gap for said rotary viscous damper.

4. The rotary viscous damper of claim 1 wherein said axial displacement means comprises:
   a bias spring having a constant spring force mounted in combination with said shaft member to exert said constant spring force against said rotor member; and
   a temperature compensation mechanism mounted in combination with said shaft member in compressive abutting engagement with said rotor member;
   first and second complementary threads formed in said damper housing and said shaft member, respectively; and
   first and second jam nuts disposed in rotatable combination with said first and second complementary threads, respectively;
   said temperature compensation mechanism and said bias spring acting in combination against said rotor member to define a baseline shear gap for said rotary viscous damper, said baseline shear gap defining a lower temperature limit of an operating temperature range of the viscous working fluid;
   said first and second jam nuts being synchronously rotatable in clockwise and counterclockwise directions, respectively, to axially displace said shaft member;

axial displacement of said shaft member causing a corresponding axial displacement in said rotor member to vary said baseline shear gap of said rotary viscous damper;

said temperature compensation mechanism being operative in response to temperature changes in the viscous working fluid to exert a temperature-dependent biasing force acting in opposition to said constant spring force against said rotor member to cause axial displacement thereof;

axial displacement of said rotor member causing corresponding dimensional changes in said shear gap to compensate for changes in the viscosity of the viscous working fluid due to the temperature changes therein such that said rotary viscous damper provides damping force constancy over the operating temperature range of the viscous working fluid.

5. A rotary viscous damper providing damping force constancy over an operating temperature range of a viscous working fluid, comprising:

a damper housing defining an internal damping chamber for the viscous working fluid, said damper housing having an internal sidewall having a conical configuration with respect to the rotational axis of said rotary viscous damper, said conical internal sidewall defining a stationary conical damping surface of said rotary viscous damper;

a shaft member mounted in rotatable combination with said damper housing;

a rotor member mounted in combination with said shaft member, said rotor member being axially displaceable with respect to said shaft member, said rotor member having a peripheral surface having a conical configuration with respect to the rotational axis of said rotary viscous damper, said conical peripheral surface defining a rotating conical damping surface of said rotary viscous damper;

said stationary conical damping surface and said rotating conical damping surface in opposed combination defining a shear gap of said rotary viscous damper;

a bias spring having a constant spring force mounted in combination with said shaft member to exert said constant spring force against said rotor member; and a temperature compensation mechanism mounted in combination with said shaft member in compressive abutting engagement with said rotor member;

said temperature compensation mechanism and said bias spring acting in combination against said rotor member to define a baseline shear gap for said rotary viscous damper;

said temperature compensation mechanism being operative in response to temperature changes in the viscous working fluid to exert a temperature-dependent biasing force acting in opposition to said constant spring force against said rotor member to cause axial displacement thereof;

axial displacement of said rotor member causing corresponding dimensional changes in said shear gap to compensate for changes in the viscosity of the viscous working fluid due to the temperature changes therein such that said rotary viscous damper provides damping force constancy over the operating temperature range of the viscous working fluid.

6. The rotary viscous damper of claim 5 wherein said temperature compensation device comprises a plurality of expansion elements mounted in combination with support sleeves, said expansion elements being formed of material having a high coefficient of thermal expansion wherein the temperature changes in the viscous working fluid cause thermal dimensional changes in said expansion elements to provide said temperature-dependent biasing force acting against said rotor member.

7. The rotary viscous damper of claim 5 wherein said temperature compensation device comprises a single expansion element, said single expansion element being formed of a material having a high coefficient of thermal expansion wherein the temperature changes in the viscous working fluid cause thermal dimensional changes in said expansion element to provide said temperature-dependent biasing force acting against said rotor member.

8. The rotary viscous damper of claim 5 further comprising adjustment means for axially positioning said rotor member to vary said baseline shear gap of the rotary viscous damper.

9. The rotary viscous damper of claim 8 wherein said adjustment means further comprises:

threads formed in said damper housing;

thread means disposed in combination with said shaft member for rotationally interacting with said threads of said damper housing; and first and second jam nuts configured for rotatable interaction with said thread means;

synchronous rotational interaction between said threads and said thread means causing axial displacement of said shaft member, said shaft member being locked in position by threaded engagement of said first and second jam nuts with said thread means;

axial displacement of said shaft member causing a corresponding axial displacement of said rotor member to vary said baseline shear gap of said rotary viscous damper.

10. A rotary viscous damper, comprising:

a damper housing defining an internal damping chamber for a viscous working fluid, said damper housing having an internal sidewall having a conical configuration with respect to the rotational axis of said rotary viscous damper, said damper housing further including a least one cylindrical partition wall protruding into said internal damping chamber, one sidewall of said at least one cylindrical partition wall having a conical configuration with respect to the rotational axis of said rotary viscous damper, said conical internal wall and said at least one conical partition sidewall defining stationary conical damping surfaces of said rotary viscous damper;

a shaft member rotatably mounted in combination with said damper housing;

at least first and second rotor members mounted in combination with said shaft member and in abutting engagement with one another, each of said first and second rotor members having a peripheral surface having a conical configuration with the rotation axis of said rotary viscous damper, said conical peripheral surfaces defining rotating conical damping surfaces of said rotary viscous damper;

said stationary conical damping surfaces and said rotating conical damping surfaces in opposed combination defining first and second baseline shear gaps of said rotary viscous damper; and adjustment means for axially positioning said at least first and second rotor members to vary said first and second baseline shear gaps of said rotary viscous damper.

11. The rotary viscous damper of claim 10 wherein said adjustment means further comprises:

threads formed in said damper housing;

thread means disposed in combination with said shaft member for rotationally interacting with said threads of said damper housing; and first and second jam nuts configured for rotatable interaction with said thread means;

synchronous rotational interaction between said thread and said thread means causing axial displacement of said shaft member, said shaft member being locked in position by threaded engagement of said first and second jam nuts with said thread means;

axial displacement of said shaft member causing a corresponding axial displacement of said rotor member to vary said baseline shear gaps of said rotary viscous damper.

* * * * *